US012091832B2

(12) United States Patent
Knowles

(10) Patent No.: US 12,091,832 B2
(45) Date of Patent: Sep. 17, 2024

(54) SYSTEM AND METHOD OF TILTING A TRACK LOADER BUCKET TO ACHIEVE DESIRED CROSS SLOPE

(71) Applicant: Caterpillar Inc., Peoria, IL (US)

(72) Inventor: Jason Stephen Knowles, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 613 days.

(21) Appl. No.: 17/229,474

(22) Filed: Apr. 13, 2021

(65) Prior Publication Data

US 2022/0325498 A1 Oct. 13, 2022

(51) Int. Cl.

| | |
|---|---|
| ***E02F 9/10*** | (2006.01) |
| ***E02F 3/43*** | (2006.01) |
| ***E02F 9/20*** | (2006.01) |
| ***E02F 9/22*** | (2006.01) |
| ***E02F 9/26*** | (2006.01) |
| ***F15B 11/10*** | (2006.01) |
| ***F15B 13/02*** | (2006.01) |
| ***F15B 19/00*** | (2006.01) |
| ***F15B 21/08*** | (2006.01) |

(52) U.S. Cl.

CPC ................ *E02F 3/43* (2013.01); *E02F 3/432* (2013.01); *E02F 9/10* (2013.01); *E02F 9/2004* (2013.01); *E02F 9/2228* (2013.01); *E02F 9/2271* (2013.01); *E02F 9/265* (2013.01); *F15B 11/10* (2013.01); *F15B 13/025* (2013.01); *F15B 19/00* (2013.01); *F15B 21/08* (2013.01)

(58) Field of Classification Search

CPC .............. E02F 3/432; E02F 9/028; E02F 9/10

See application file for complete search history.

(56) References Cited

U.S. PATENT DOCUMENTS

| | | | | |
|---|---|---|---|---|
| 1,686,941 A * | 10/1928 | Taylor | E02F 9/028 | 172/507 |
| 3,430,790 A * | 3/1969 | Beltrami | E02F 9/10 | 180/41 |
| 4,152,004 A * | 5/1979 | Schroder | E02F 9/028 | 280/124.112 |
| 4,382,604 A * | 5/1983 | Nakagawa | B60G 17/056 | 280/124.112 |
| 5,598,896 A | 2/1997 | Haest | | |
| 5,933,346 A | 8/1999 | Brabec et al. | | |
| 6,145,609 A * | 11/2000 | Hoelscher | B62D 55/116 | 180/9.1 |

(Continued)

FOREIGN PATENT DOCUMENTS

| | | |
|---|---|---|
| FR | 3071565 A1 * | 3/2019 |
| JP | 07324353 A * | 12/1995 |

(Continued)

*Primary Examiner* — Gary S Hartmann

(57) ABSTRACT

A track-type loader machine includes a main frame, laterally spaced track roller frames, an equalizer bar pivotally mounted to the main frame and attached to the roller frames, a work implement movably connected to the main frame by a plurality of linkages, and at least one cross-slope actuator which connects one of the roller frames to the main frame. The at least one cross-slope actuator is configured to tilt the work implement and the plurality of linkages in conjunction with the main frame relative to a pivoting axis of the equalizer bar.

15 Claims, 6 Drawing Sheets

(56) References Cited

U.S. PATENT DOCUMENTS

| | | | | |
|---|---|---|---|---|
| 7,461,712 | B2 * | 12/2008 | Law | E21B 7/024 180/41 |
| 8,180,532 | B2 * | 5/2012 | O'Halloran | B60G 17/0165 280/6.154 |
| 8,528,671 | B2 | 9/2013 | Beasley et al. | |
| 8,870,303 | B2 | 10/2014 | Moser | |
| 10,131,387 | B2 * | 11/2018 | Erlinger | B60B 35/1045 |
| 10,865,542 | B2 | 12/2020 | Smith et al. | |
| 11,259,463 | B1 * | 3/2022 | Leis | A01D 34/006 |
| 2018/0215425 | A1 | 8/2018 | Roske et al. | |
| 2022/0259817 | A1 * | 8/2022 | Hayashi | B60G 9/02 |

FOREIGN PATENT DOCUMENTS

| | | | | |
|---|---|---|---|---|
| KR | 20-0396094 | Y1 | | 9/2005 |
| WO | WO-0246539 | A1 | * | 6/2002 |

* cited by examiner

SYSTEM AND METHOD OF TILTING A TRACK LOADER BUCKET TO ACHIEVE DESIRED CROSS SLOPE

TECHNICAL FIELD

The present disclosure is directed to a track-type loader machine, grading control system and method for tilting a track loader bucket to move loose earth to achieve desired cross slope. The method provides direct control of a cross tilt of the bucket cutting edge.

BACKGROUND

Preparation of a worksite may include grading a worksite using a machine to form an earth ground surface having a desired grade. Grading a worksite may include preparing the ground surface to have a desired elevation, a desired slope in a direction of travel of the machine and/or a cross-slope in a direction generally perpendicular to the direction of travel of the machine.

Machines for grading a worksite include track-type loader machines. Track-type loader machines may be used to cut or fill areas of earth to the desired elevation, the desired upward/downward slope in the direction of travel and/or the desired cross-slope. In order to cut or fill areas of earth to the desired elevation and cross-slope, an operator may position an entire track-type loader machine just before an area at a desired slope before starting to dig or to make grading passes on multiple machine headings to achieve the desired cross-slope.

An approach for cutting or filling areas of earth to a desired cross-slope has been to tilt an implement of a track-type loader machine relative to the main frame of the loader machine. For example, U.S. Pat. No. 10,865,542 of Smith et al. issued on Dec. 15, 2020 ("the '542 patent") discloses a grading control system of a compact track loader machine having a controller configured to actuate one or both lift and tilt actuators to orient the work implement according to a determined orientation. Although the '542 patent discloses a grading control system for grading along a grade, tilting the work implement to achieve a desired grade is primarily suited for light-duty work involving soft or light-weight materials in worksites, such as loose dirt or sand. For compact, hard or heavy materials, achieving a desired grade by tilting the work implement can place excessive unbalanced loads on the implement, which can lead to uneven and even twisting moments and forces on linkages and hydraulic cylinders used to move and tilt the implement. Such moments and forces may be substantial enough to reduce loader machine durability.

There is a need for large track-type loader machines for grading a worksite having compact, hard, or heavy materials.

The system and method of tilting a track loader bucket to perform cross-slope grading of the present disclosure may solve one or more problems set forth above and/or other problems of conventional track-type loader machines.

SUMMARY

In one aspect, a track-type loader machine can comprise a main frame; a plurality of track roller frames respectively disposed on either side of the main frame; an equalizer bar pivotally mounted to the main frame and attached to the plurality of track roller frames; a work implement movably connected to the main frame by a plurality of linkages; and at least one actuator which connects one of the plurality of track roller frames to the main frame. The at least one actuator is configured to tilt the work implement and the plurality of linkages in conjunction with rotation of the main frame relative to a pivoting axis of the equalizer bar.

In another aspect, a grading control system can comprise a main frame of a track-type loader machine, the main frame having a pivoting axis along a direction of movement of the track-type loader machine and configured to rotate to a cross-tilt angle by way of rotation about the pivoting axis; a work implement movably connected to the main frame; a cross-slope actuator configured to cause the main frame to rotate to the cross-tilt angle about the pivoting axis of the main frame which causes the work implement to rotate to the cross-tilt angle about the pivoting axis in conjunction with rotation of the main frame; a cross-tilt sensor configured to communicate a signal indicative of the cross-tilt angle of the work implement; and a controller in communication with the cross-tilt sensor. The controller is configured to determine a desired cross-slope grade, determine a cross-tilt angle of the work implement to maintain the desired cross-slope grade, and generate at least one control signal to actuate the cross-slope actuator to rotate the main frame of the track-type loader machine based on the determined cross-tilt angle which orients the work implement to the determined cross-tilt angle.

And in another aspect, a grading control method for a track-type loader machine can comprise receiving at least one input indicative of a desired cross-slope grade; determining, using a controller, a cross-tilt angle of a work implement of the track-type loader machine to maintain the desired cross-slope grade; and generating at least one control signal to actuate a cross-slope actuator to rotate a main frame of the track-type loader machine based on the determined cross-tilt angle which orients the work implement to the determined cross-tilt angle, in which the main frame has a pivoting axis in a direction of movement of the track-type loader machine and the main frame is configured to rotate based on the cross-tilt angle by way of rotation about the pivoting axis.

DETAILED DESCRIPTION

Figure 1:
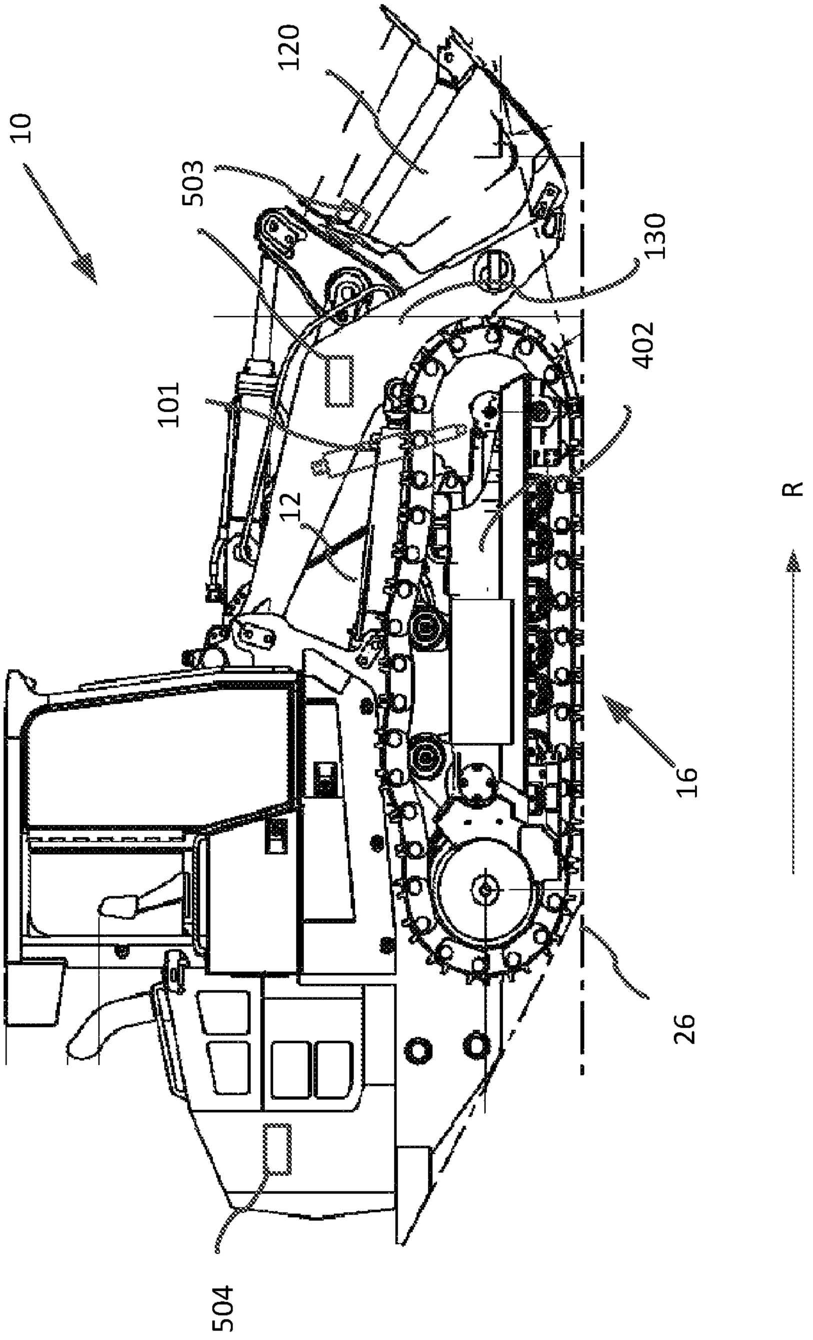
FIG. 1 is a side view of a track-type loader machine in accordance with an embodiment of the present disclosure.

In the drawings, like reference numerals designate identical or corresponding parts throughout the several views.

FIG. 1 is a side view of a non-limiting track-type loader machine 10. The track-type loader machine 10 includes laterally spaced track roller assemblies. Although the track-type loader machine 10 shows one track roller assembly 16, it is recognized that the track roller assembly on the other side of the track-type loader machine 10 is a mirror image of the track roller assembly 16 shown in FIG. 1. The track roller assembly 16 includes a track roller frame 402. The track roller frame 402 serves as the structure about which a track moves in order to move the track-type loader machine 10 over a ground surface 26 in a movement direction R.

A work implement, such as a bucket 120 or blade (not shown), is connected by a pair of loader linkages 130, each of which is movably attached to a main frame 12 of the track-type loader machine 10. A cross-slope actuator 101 may be mounted to the track roller frame 402 of the track roller assembly 16.

Figure 2:
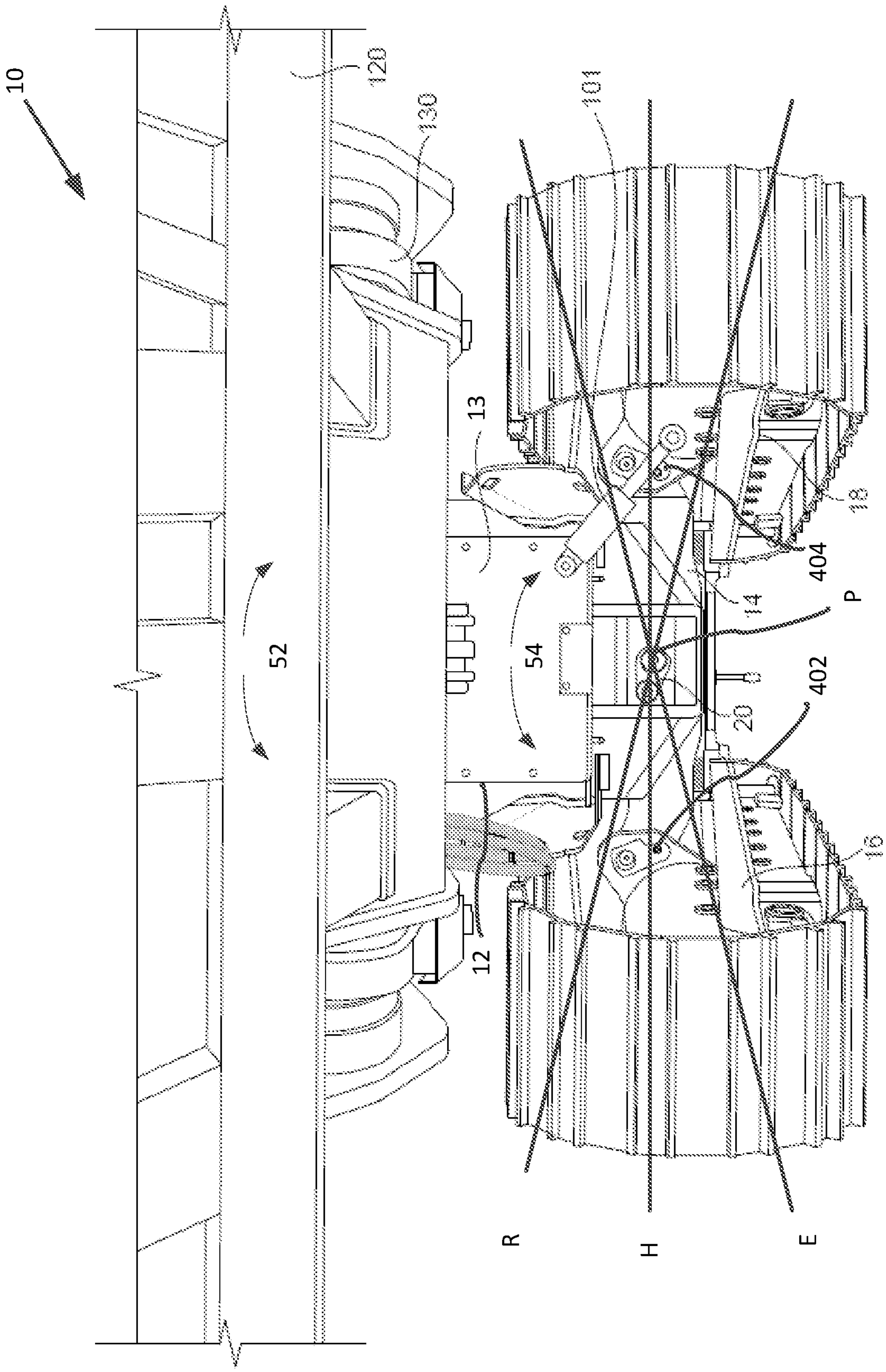
FIG. 2 is a front view of a portion of the track-type loader of FIG. 1 shown with the loader bucket raised to expose an equalizer bar in accordance with an embodiment of the present disclosure.

FIG. 2 is a front view of the track-type loader machine 10 shown with the bucket 120 raised to expose an equalizer bar 14. Although FIG. 2 shows a bucket 120, it should be understood that other types of work implements can be attached to the track-type loader machine 10. A work implement such as the bucket 120 is connected to the main frame 12 by the pair of loader linkages 130, which are shown in the raised position in order to expose the equalizer bar 14 connected between the main frame 12 and each of the track roller assemblies 16, 18.

A track-type loader machine uses an equalizer bar 14 to allow each side track of the track-type loader machine 10 to shift and pivot relative to the main frame 12 in order to negotiate uneven or irregular terrain. As shown in FIG. 2, the equalizer bar 14 is an elongated member which is pivotally connected to the main frame 12 at a mid-portion of the equalizer bar 14, shown as pivot axis P of the equalizer bar 14. The track roller frame 402 of the track roller assembly 16 may be attached or coupled to an end portion of the equalizer bar 14. In a similar manner, a track roller frame 404 of the track roller assembly 18 may be attached or coupled to an opposite end portion of the equalizer bar 14. Each end portion of the equalizer bar 14 is pivotally connected to a respective track roller frame 402, 404 in a similar manner such that the equalizer bar 14 is movable with respect to the respective track roller frame 402, 404.

In one or more embodiments, the cross-slope actuator 101 may be mounted to the forward face plate 13 of the main frame 12 and to an inner surface of one of the track roller assemblies, shown as mounted to the track roller assembly 18 in FIG. 2. Additional cross-slope actuators (not shown) in addition to the cross-slope actuator 101 may also be connected to the main frame 12 and at least one of the tracker roller assemblies 16, 18. In one or more embodiments, another cross-slope actuator (not shown) may be mounted to a rear plate of the main frame 12. In one or more embodiments, a pair of cross-slope actuators (one cross-slope actuator 101 is shown) may be mounted to the forward face plate 13 and connect to each of the lateral track roller assemblies 16, 18. The cross-slope actuator 101 or pair of cross-slope actuators (one cross-slope actuator 101 is shown) mounted to the forward face plate 13 are positioned forward of the equalizer bar 14 in the movement direction R of the track-type loader machine 10.

Figure 3:
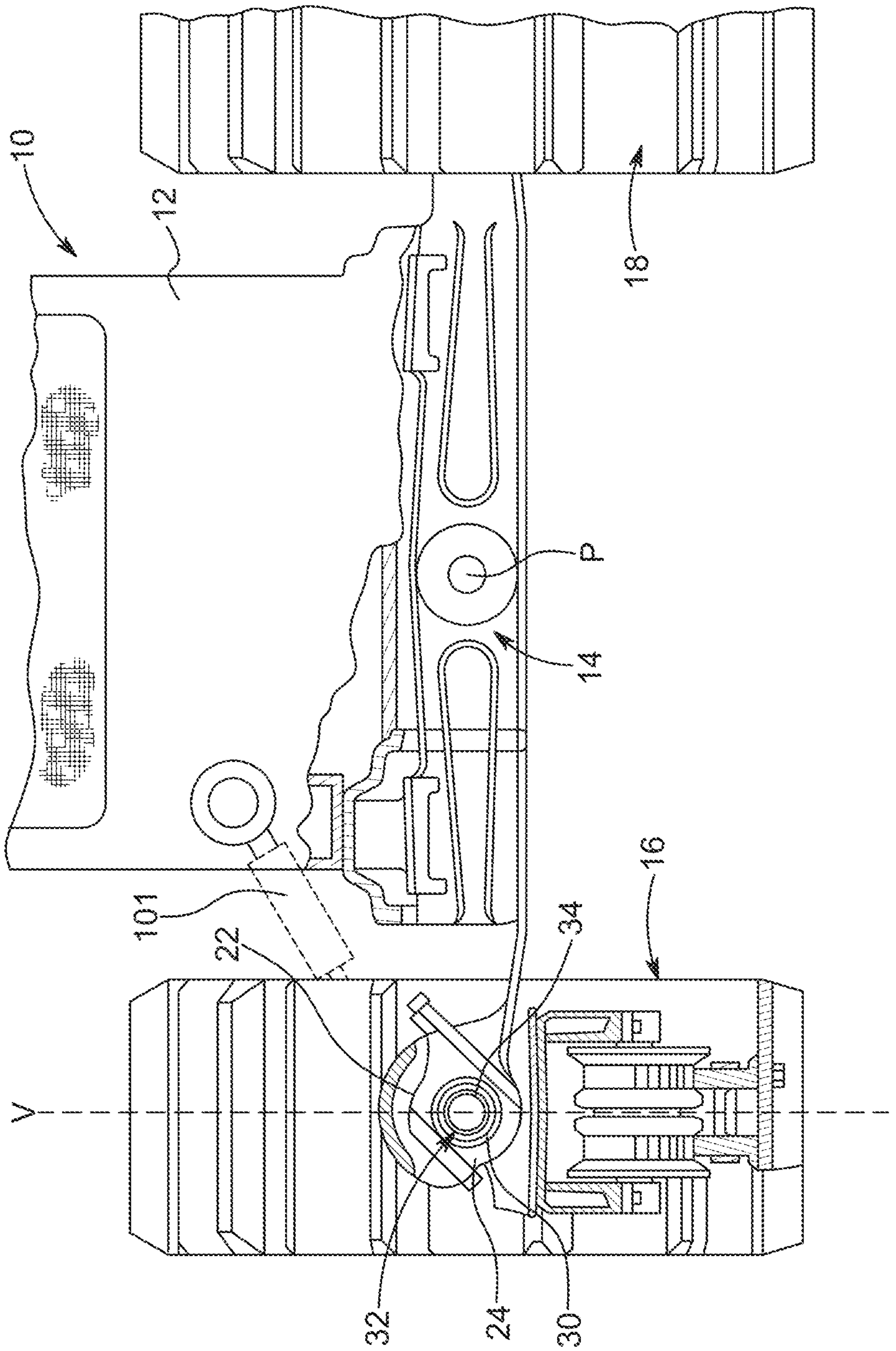
FIG. 3 is a front view with partial cross-section of a track-type loader machine having an equalizer bar in accordance with an embodiment of the present disclosure.

FIG. 3 is a front view of a track-type loader machine 10 having the equalizer bar 14 that may be used for grading a worksite, and includes details of a track roller assembly 16. The equalizer bar 14 has first and second end portions and a center portion, and the equalizer bar 14 is positioned transverse to the direction of travel of the track-type loader machine 10.

The equalizer bar 14 includes a main body end portion 22. An end cap 24 may be associated with the main body end portion 22. The main body end portion 22 and end cap 24 generally surround the outer race 30 of the spherical bearing 32. The inner race 34 on the spherical bearing 32 is mounted on part of the track roller assembly 16. The spherical bearing 32 allows for misalignment which occurs when the machine is operated over uneven terrain, resulting in pivoting of the track roller assembly 16 and the equalizer bar 14.

As can be seen in FIG. 3, the equalizer bar-track roller frame pivot axis is positioned substantially along the vertical center line V of the track roller assembly 16. Such positioning prevents vertical force applied to the track roller assembly 16 from the ground from inducing a turning moment of the track roller assembly 16 about the pivot axis of the spherical bearing 32, which would be the case if such spherical bearing 32 is placed inward or outward of such vertical center line V of the track roller assembly 16.

Figure 4:
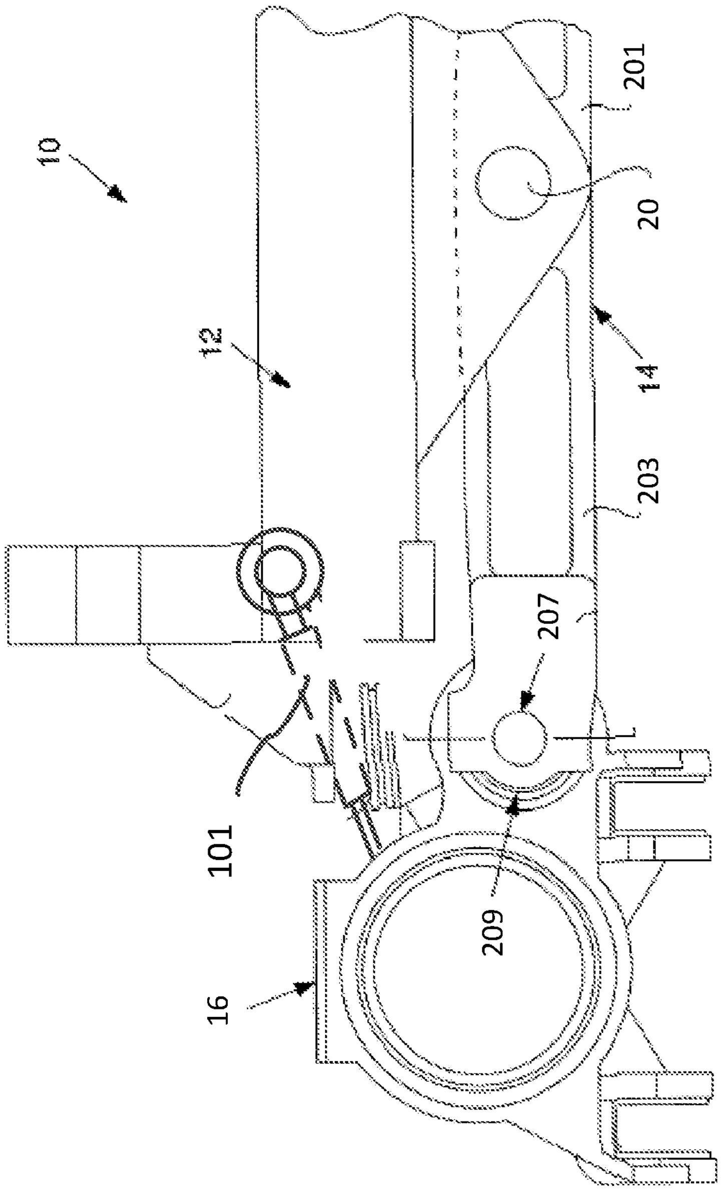
FIG. 4 is a front view of a partial track loader machine structure including an alternative equalizer bar in accordance with an embodiment of the present disclosure.

FIG. 4 is a front view of a portion of a track-type loader machine 10 that includes a main frame 12, an equalizer bar 14 and a track roller assembly 16, in which the track roller assembly 16 is coupled to the equalizer bar by a bearing joint 207. Although FIG. 4 only illustrates the equalizer bar 14 coupled to the left roller assembly 16, it will be appreciated that the right side of the track-type loader machine 10 structure can be a mirror image of that shown in FIG. 4. Referring to FIG. 4, the equalizer bar 14 is pivotally connected to the main frame 12 by pivot connection 20 at a mid-portion 201 of the equalizer bar, and track roller assembly 16 is attached or coupled to the left end portion 203 of the equalizer bar 14 by bearing joint 207. Bearing joint 207 is depicted in FIG. 4 as including a cylindrical bearing 209, although spherical bearings can also be used. The track roller assembly 16 is attached to the main frame 12 of the loader by two pivot shafts and the equalizer bar 14.

INDUSTRIAL APPLICABILITY

Referring to FIG. 1 and FIG. 2, track-type loader machine 10 of the present disclosure includes a bucket 120 that is connected by a loader linkage 130. The loader linkage 130 and the bucket 120 are configured to tilt, in conjunction with the main frame 12, to the left or right with respect to the track roller frame 402 by a cross-slope actuator 101, such as a hydraulic cylinder or pneumatic cylinder, which rotates the main frame 12 of the track-type loader machine 10 to the left or right relative to a pivot axis P of the equalizer bar 14, as illustrated in FIG. 2. The present disclosure describes a structure configured for lifting, forward tilting and/or cross-tilting the bucket 120 to cut or fill to a desired elevation and/or slope.

Referring to FIG. 1, the structure for cross-tilting the bucket 120 includes at least one cross-slope actuator 101 configured to extend or retract to and from the main frame 12 of the track-type loader machine 10. The at least one cross-slope actuator 101 may include electro-hydraulic cylinders or electro-pneumatic cylinders. The hydraulic system or pneumatic system that serves the electro-hydraulic cylinder of electro-pneumatic cylinder, respectively, may include a pressure sensor and a mechanism for adjusting pressure in the respective electro-hydraulic cylinder or electro-pneumatic cylinder in order to extend and retract the electro-hydraulic cylinder or the electro-pneumatic cylinder, as well as to hold the electro-hydraulic cylinder or the electro-pneumatic cylinder in a certain position. The mechanism may include an electronically controlled pump to adjust the pressure in the electro-hydraulic cylinder or the electro-pneumatic cylinder.

In a neutral position, the cross-slope actuator 101 is in a position in which the main frame 12 is parallel to a horizontal axis H through a center of each of the track roller assemblies 16, 18, when the track roller assemblies 16 and 18 are on level ground, as illustrated in FIG. 2. This configuration may provide good operator comfort, since the operator seat (not shown) of the track-type loader machine also will be kept level. The equalizer bar 14 pivots about a pivot axis P (shown normal to the view as an end point). In an extended position, the cross-slope actuator 101 holds the main frame 12 at a cross-tilt angle E, while track roller assemblies 16, 18 remain in the neutral position. In a retracted position, the cross-slope actuator 101 holds the main frame 12 at an inverse cross-tilt angle R, while track roller assemblies 16, 18 remain in the neutral position. The range of cross-tilt angle E to inverse cross-tilt angle R is within the range of movement of the main frame 12 allowed by the equalizer bar 14. Extension and retraction of the cross-slope actuator 101 rotates the main frame 12 left and right 54 about pivot axis P. Rotation of the main frame 12 causes a comparable rotation 52, i.e. cross-tilting, of the bucket 120.

Since the cross-slope actuator 101 can selectively shift, clockwise or counterclockwise with regard to the movement direction R, the main frame 12 and the bucket 120 relative to the track roller assemblies 16, 18, the bucket 120 can be caused to lean left or right and move spoil or excavate at an angle different from the angle of the surface 26 upon which the track-type loader machine rides.

Further, when the track-type loader machine 10 operates on a surface that slopes relative to the movement direction R (meaning the track roller assemblies 16, 18 are not level, one being uphill and higher, the other being downhill and lower), the cross-slope actuator 12 can be used to shift the main frame 12 into the slope of the surface so that the operator's seat is in a more vertical orientation, increasing operator comfort. Conversely, there may be situations where it is desirable to use the cross-slope actuator to shift the main frame 12 away from the slope of the surface.

In one or more embodiments, the operation of the cross-slope actuator 101 may be released to allow the track roller assemblies 16, 18 to move freely relative to the profile of the ground that the track-type loader machine 10 is traveling over. Since the main frame 12 can shift relative to the track roller assemblies 16, 18, operator comfort can be enhanced. The cross-slope actuator 101 may be released by depressurizing the hydraulic fluid or air within the hydraulic cylinder or pneumatic cylinder, respectively.

When the cross-slope actuator 101 is held in the retracted or extended position, the bucket 120 is held at the same angle as the main frame 12, thus positioning the loader linkages 130 comparable to when the bucket 120 and main frame 12 are performing grading on level ground. In other words, the loader linkages 130 are held at relatively the same position as each other.

Figure 5:
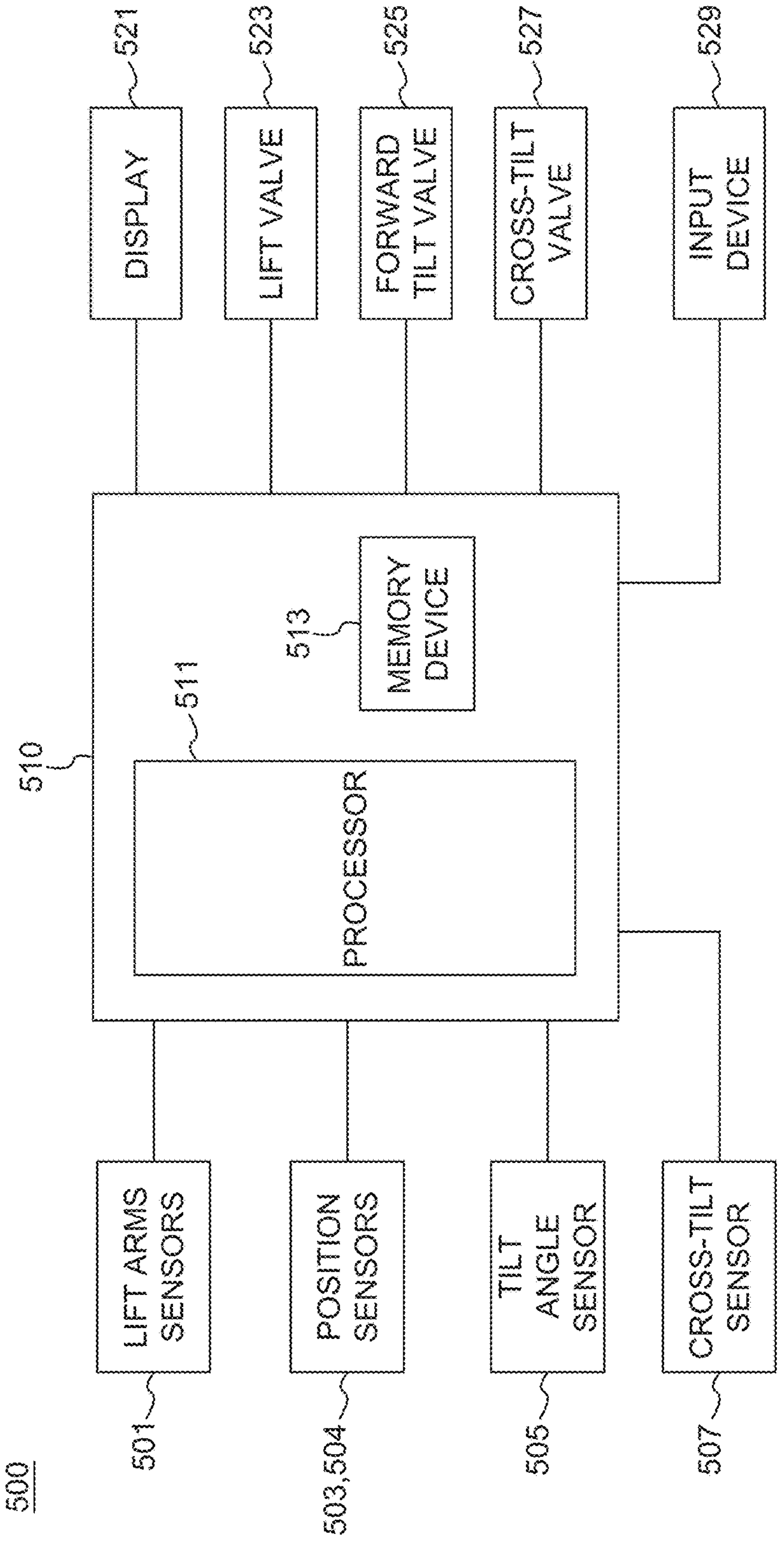
FIG. 5 is a block diagram for an exemplary grading control system in accordance with an embodiment of the present disclosure.
Figure 6:
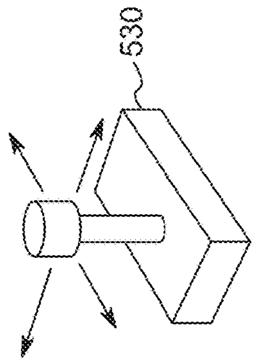
FIG. 6 is an exemplary control lever as an input device for the grading control system in accordance with an embodiment of the present disclosure.

FIG. 5 is a block diagram for an exemplary grading control system 500. FIG. 6 is an exemplary control lever 530 such as a joystick. The control lever 530 is provided to allow an operator to tilt the track-type loader machine 10 as required to maintain or achieve the desired forward tilt and/or cross-tilt. An additional control feature may be provided to allow the cross-slope actuator 101 to float, in which the track-type loader machine 10 enters a mode of operation where the track roller assemblies 16,18 are allowed to move freely in response to the profile of the ground that the track-type loader machine 10 is traveling over.

As will be discussed further below, the desired grade may be determined based on position data from position sensors 503 and 504 (see FIG. 1), which can be inertial measurement circuits.

Regarding FIG. 5, the exemplary grading control system 500 controls the orientation of bucket 120 during grading operations performed by track-type loader machine 10. As described in greater detail below, grading control system 500 may be configured to determine an orientation of bucket 120 and/or move bucket 120 while grading a worksite so that the finished grade may substantially correspond to a desired grade on a ground surface 26. Grading control system 500 may include input devices 529, controller 510, display devices 521, one or more sensors 501, 503, 504, 505, 507 that provide measured inputs, and one or more valves 523, 525, 527 that may help control lift actuators (not shown), tilt actuators (not shown), and/or cross-tilt actuators 101. In some exemplary embodiments, grading control system 500 may be located onboard track-type loader machine 10, which may be autonomous or remotely controlled. In these exemplary embodiments, grading control system 500 may be configured to adjust the orientation of bucket 120 and/or move bucket 120 while grading a worksite even when track-type loader machine 10 and/or bucket 120 may not be visible to a remote operator. In other exemplary embodiments, grading control system 500 may be part of an overall machine autonomous control system, which may allow track-type loader machine 10 to grade a worksite based on predetermined requirements and/or inputs received based on measurements from various sensors associated with track-type loader machine 10.

Input device(s) 529 may include one or more of joysticks, keyboards, knobs, levers, touch screens, or other input devices as one of ordinary skill would recognize. To generate a desired movement signal, input device(s) 529 may receive one or more inputs from an operator and may communicate the one or more inputs as in the form of one or more signals to controller 510. Input device(s) 529 may be used to operate or drive track-type loader machine 10, and may also be used to manually control lift actuators (not shown), tilt actuators (not shown), and/or cross-slope actuator 101. Further, input device(s) 529 may be used to control a speed of track-type loader machine 10 and/or to steer track-type loader machine 10 as track-type loader machine 10 travels over ground surface 26.

Controller 510 may include one or more processors 511 and/or one or more memory devices 513. Controller 510 may be configured to control operations of input devices 529, display devices 521, lift actuators (not shown), tilt actuators (not shown), cross-slope actuators 101, and/or other operations of track-type loader machine 10. Processor 511 may embody a single or multiple microprocessors, digital signal processors (DSPs), etc. Numerous commercially available microprocessors can be configured to perform the functions of processor 511. Various other circuits may be associated with processor 511, including power supply circuitry, signal-conditioning circuitry, and communication circuitry.

The one or more memory devices 513 may store, for example, one or more control routines or instructions for determining a position of bucket 120 relative to machine frame 12 or ground surface and for controlling bucket 120 based on the determined position. Memory device 513 may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 510 may receive one or more input signals from the one or more input devices 529 and may execute the routines or instructions stored in the one or more memory devices 513 to generate and deliver one or more command signals to one or more of lift valves 523, tilt valves 525, and/or cross-tilt valve 527 associated with lift actuators (not shown), tilt actuators (not shown), and cross-slope actuators 101, respectively.

One or more display devices 521 may be associated with controller 510 and may be configured to display data or information in cooperation with processor 511. In one exemplary embodiment, display device 521 may show the position of bucket 120 as x, y, z coordinates. In another exemplary embodiment, display device 521 may show lift, tilt, and/or cross-tilt angles. In another exemplary embodiment, display device 521 may include a series of LED lights that indicate whether an edge of the bucket 120 is above grade, on grade, or below grade. In one exemplary embodiment, instead of a visual display, controller 510 may be associated with an audible indicator (not shown) configured to indicate through the production of sound whether the edge of bucket 120 is above grade, on grade, or below grade. In yet another exemplary embodiment, controller 510 may be associated with both display device 521 and the audible indicator. Display device 521 may be a cathode ray tube (CRT) monitor, a liquid crystal display (LCD), a light emitting diode (LED) display, a projector, a projection television set, a touchscreen display, or any other kind of display device known in the art.

Position sensor 503 may be an inertial measurement circuit disposed on at least one loader linkage 130. In one exemplary embodiment, position sensor 503 may be a six degree-of-freedom inertial measurement circuit configured to generate a signal indicative of one or more of a position, inclination, acceleration, speed, etc. of loader linkage 130 as loader linkage 130 moves in response to movements of lift actuators and/or track-type loader machine 10. For example, position sensor 503 may generate a signal indicative of a position of loader linkage 130 relative to main frame 12, ground surface 26, or gravity vector. In one exemplary embodiment, the signal from lift arm sensors 501 may be indicative of a height of bucket 120 above ground surface 26 or above main frame 12. In another exemplary embodiment, lift arm sensors 501 may be an angle sensor configured to measure a lift arm angle of loader linkage 130 relative to main frame 12 or ground surface 26. In some exemplary embodiments, lift arm sensors 501 may be located adjacent loader joints, although lift arm sensors 501 may be disposed anywhere on loader linkage 130 without departing from the scope of the present disclosure. In some exemplary embodiments, lift arm sensors 501 may be disposed on bucket 120, or on a coupler or other linkage mechanisms associated with loader linkage 130 and bucket 120, the coupler or linkage mechanisms being configured to couple bucket 120 to loader linkage 130.

Position sensor 504 may also be an inertial measurement circuit disposed on main frame 12. Like link arm sensors 501, in one exemplary embodiment, position sensor 504 may be a six degree-of-freedom inertial measurement unit configured to generate a signal indicative of one or more of a position, inclination, acceleration, speed, etc. of main frame 12. For example, position sensor 504 may generate a signal indicative of a position of main frame 12 relative to ground surface or gravity vector.

Tilt angle sensor 505 may be an angle sensor configured to generate a signal indicative of tilt angle between bucket 120 and loader linkage 130.

Although exemplary sensors 501 and 503 have been described above as inertial measurement circuits having six degrees of freedom, sensors 501 and 503 may be inertial measurement circuits having more than or less than six degrees of freedom.

Further, although sensors 501 and 503 have been described above as inertial measurement circuits and tilt angle sensor 505 as an angle sensor, any of sensors 501, 503, 504, and 505 may be position sensors, rotary sensors, angle sensors, inertial measurement circuits, force sensors, acceleration sensors, speed or velocity sensors, or any other types of sensors without departing from the scope of the present disclosure. Sensors 501, 503, 504, and 505, may be in communication with controller 510 and may provide signals to controller 510 indicative of their respective sensed parameters. Additionally or alternatively, lift actuators (not shown), tilt actuators (not shown), and cross-slope actuator 101 may include in-cylinder or other position sensors that may be configured to measure an amount of extension or retraction of lift actuators (not shown), tilt actuators (not shown), and cross-slope actuator 101, respectively.

Controller 510 may also be configured to determine the distance or amount of movement in one or more of the lift, tilt, or cross-slope 101 actuators required to orient bucket 120 so that edge of bucket 120 excavates ground surface to substantially generate the desired grade. Desired grade may include a desired mainfall and a desired cross-slope. In one exemplary embodiment, controller 510 may determine the distance or amount of movement in one or more of the lift, tilt, or cross-slope 101 actuators based on trigonometric and/or kinematic equations, or based on a kinematic linkage based model of track-type loader machine 10 stored in memory device 513. Controller 510 may determine the distance or amount of movement in one or more of the lift, tilt, or cross-slope 101 actuators based on look-up tables, flow charts, physical models, simulations, or other algorithms. One or more of lift, tilt, or cross-slope actuators may also include sensors built into or mounted onto lift, tilt, or cross-slope 101 actuators, so that controller 510 may determine the distance or amount of movement in one or more of lift, tilt, or cross-slope 101 actuators based on signals generated by the built-in or attached sensors 501, 503, 504, 505, 507.

Figure 7:
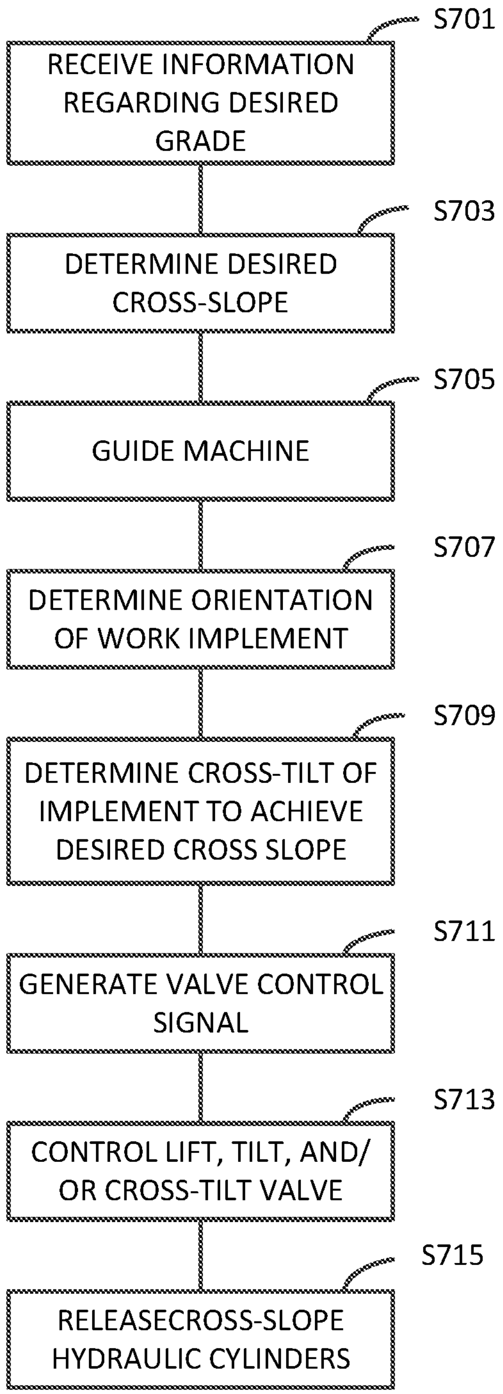
FIG. 7 is a flowchart of a grade control method performed by the grade control system in accordance with an embodiment of the present disclosure.

FIG. 7 is a flowchart of a grade control method performed by the grade control system of FIG. 5. The grade control method tilts a track loader work implement such as bucket 120 to cut or fill to a desired elevation and/or cross-slope in a manner that minimizes a requirement of the operator to position the entire track-type loader machine 10 just prior to an area at the desired elevation and cross-slope.

The control method may include a step, S701, of receiving information regarding a desired grade for a worksite. Information regarding the desired grade may be received, for example, via the one or more input devices 529 associated with track-type loader machine 10. In one exemplary embodiment, the information may include a desired elevation and/or cross-slope. In another exemplary embodiment, the information may include an initial orientation of bucket 120. For example, the information may include a lift angle, a tilt angle, and/or a cross-slope angle associated with bucket 120.

The control method may include a step, S703, of determining the desired cross-slope. Controller 510 may determine the desired cross-slope based on the information received in, for example, step S701. In one exemplary embodiment, controller 510 may determine a plane defined by one or more of angles, and the known geometry of bucket 120. Controller 510 may then determine the desired grade (i.e. the desired lift, tilt, and cross-slope) based on an orientation of the plane relative to a track plane. The track plane may represent a plane corresponding to portions of ground surface 26 on which the track roller frames 16, 18 makes contact with the ground surface 26. In another exemplary embodiment, controller 510 may determine the desired cross-slope based on a plane defined by one or more points on the track plane and one or more points on bucket 120, after orienting bucket 120 to the initial orientation specified by an operator or track-type loader machine 10, for example, in step S701.

The control method may include a step, S705, of guiding track-type loader machine 10 over ground surface 26 of a worksite. Track-type loader machine 10 may be guided on ground surface 26 manually by an operator by using the at least one control lever 530 in FIG. 6, located in an operator's station of track-type loader machine 10. Alternatively, track-type loader machine 10 may be guided on ground surface 26 automatically by controller 510, which may control one or more of a speed, acceleration, heading, and/or steering of track-type loader machine 10 based on a predetermined travel path stored in or calculated from memory device 513.

The control method may include a step, S707, of determining an orientation of a work implement such as bucket 120. Controller 510 may determine an orientation of bucket 120 by monitoring a height of bucket 120 above ground surface 26, a forward tilt position of bucket 120, and/or a cross-slope position bucket 120. Controller 510 may determine the height, lift position, and/or cross-slope position by determining a length of one or more of lift actuators (not shown), tilt actuators (not shown), and/or cross-slope actuator 101. Controller 510 may combine the determined lengths with geometric, trigonometric, and/or kinematic equations representing the geometry of track-type loader machine 10 to determine the height, lift position, and/or cross-slope position of bucket 120.

In step S709, controller 510 may determine the cross-tilt angle of the work implement such as bucket 120 by determining the cross-tilt angle of the main frame 12. In some exemplary embodiments, controller 510 may determine a cross-tilt angle for bucket 120 required to orient bucket 120 relative to the gravity vector based on the orientation provided by an operator, for example, in step S701. In these exemplary embodiments, controller 510 may determine a cross-tilt angle required to maintain bucket 120 on a plane corresponding to the desired cross-slope as determined, for example, in step S703 based on, for example, one or more geometric, trigonometric, and/or kinematic equations, and/or kinematic models, or other algorithms stored in memory device 513.

The control method may include a step, S711, of generating valve control signals corresponding to the determined new orientation of bucket 120. In step S711, controller 510 may generate control signals for one or more of valves 523, 525, 527 associated with one or more of lift actuators (not shown), tilt actuators (not shown), and/or cross-tilt actuator 101, respectively. The control method may include a step of controlling one or more of lift 523, tilt 525, and/or cross-slope 527 valves to orient bucket 120 according to the determined orientation (Step S713). In step S713, controller 510 may adjust the flow of, for example, hydraulic fluid to or from one or more of lift actuators (not shown), tilt actuators (not shown), and/or cross-slope actuator 101 by controlling one or more of lift, tilt, and/or cross-slope valves to orient bucket 120. In some exemplary embodiments, valve control signals generated by controller 510 for one or more of valves 523, 525, 527 may supplement signals generated for valves 523, 525, 527 based on one or more input devices 529, which may be operated by an operator of track-type loader machine 10. In other exemplary embodiments lift actuators (not shown), tilt actuators (not shown), and cross-slope actuator 101 may be adjusted based solely on valve control signals generated by controller 510 in, for example, step S711.

The cross-slope actuator 101 rotates the main frame 12 of the track-type loader machine 10 relative to the track roller assemblies 16, 18 and orients the bucket 120 to a cross-tilt angle based on the determined cross-slope while maintaining the loader linkages 130 in a fixed position.

The control method may include a step, S715, of releasing the hydraulic or pneumatic cylinders so that they float, such that the track-type loader machine 10 moves to a mode of operation where track roller frames 402 are allowed to move freely relative to the profile of the ground that the track-type loader machine 10 is traveling over. The releasing of the hydraulic or pneumatic cylinders may be accomplished by sending a valve control signal that controls the cross-tilt valve 527 to depressurize the hydraulic fluid or air, respectively, within the hydraulic or pneumatic cylinder, cross-slope actuator 101.

Activation of the cross-slope actuator 101 rotates side-to-side the main frame 12 that is supported by the equalizer bar 14. When the main frame 12 rotates sideways, the bucket 120 rotates by the same angle. Thus, the loader linkage arms 130 may be held in substantially the same position while the work implement is in a cross-slope position. Rotating the bucket 120 by rotating the main frame 12 can minimize uneven forces on the implement, which minimizes twisting moments and forces on loader linkage 130 arms and associated hydraulic cylinders used to move the bucket 120 to a cross-tilt angle. Reducing such uneven forces can improve the durability of the track-type loader machine 10.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof. The scope of protection to which applicant is entitled is to be determined only by the recited claims.

The invention claimed is:

1. A track-type loader machine, comprising:
a main frame;
a plurality of track roller frames respectively disposed on either side of the main frame;
an equalizer bar pivotally mounted to the main frame and attached to the plurality of track roller frames;
a work implement movably connected to the main frame by a plurality of linkages; and
at least one cross-slope actuator which connects one of the plurality of track roller frames to the main frame,
wherein the at least one cross-slope actuator is configured to tilt the work implement and the plurality of linkages together with tilting of the main frame in a width direction of the track-type loader machine relative to a pivoting axis of the equalizer bar, and wherein the work implement is tiltable in the width direction of the track-type loader machine relative to the plurality of track roller frames.

2. The track-type loader machine of claim 1, wherein the work implement is a bucket, and wherein the plurality of linkages are actuatable to selectively raise, lower, and tilt the bucket.

3. The track-type loader machine of claim 1, wherein the at least one cross-slope actuator is an electro-hydraulic cylinder that uses hydraulic pressure to shift the main frame of the track-type loader machine to tilt the plurality of linkages and the work implement relative to pivoting of the equalizer bar.

4. The track-type loader machine of claim 1, wherein the plurality of track roller frames are attached to the main frame via two pivot shafts and the equalizer bar.

5. The track-type loader machine of claim 1, wherein the at least one cross-slope actuator is mounted in a center portion of the one of the plurality of track roller frames forward of the equalizer bar in a movement direction of the track-type loader machine.

6. The track-type loader machine of claim 1, further comprising:

a controller configured to control the at least one cross-slope actuator to tilt the main frame in order to tilt the work implement to maintain or achieve a desired cross slope.

7. The track-type loader machine of claim 6, wherein the controller is further configured to release the at least one cross-slope actuator based on receipt of a user input, and wherein, upon releasing the at least one cross-slope actuator, the track-type loader machine enters a mode of operation where the plurality of track roller frames move freely in response to a profile of a ground that the track-type loader machine is traveling over.

8. The track-type loader machine of claim 7, wherein the at least one cross-slope actuator is an electro-hydraulic cylinder, and wherein the controller is configured to release the at least one cross-slope actuator by causing hydraulic fluid in the electro-hydraulic cylinder to be depressurized.

9. The track-type loader machine of claim 6, wherein the desired cross slope is determined based on an inertial measurement circuit.

10. A track-type machine, comprising:

a main frame;

a plurality of track roller frames respectively on opposite sides of the main frame;

an equalizer bar pivotally mounted to the main frame and attached to the plurality of track roller frames;

a work implement movably connected to the main frame; and at least one cross-slope actuator which connects one of the plurality of track roller frames to the main frame, wherein the at least one cross-slope actuator is configured to tilt the work implement together with tilting of the main frame in a width direction of the track-type machine relative to the equalizer bar, and wherein the work implement is tiltable in the width direction of the track-type machine relative to the plurality of track roller frames.

11. The track-type machine according to claim 10, wherein the at least one cross-slope actuator includes a first cross-slope actuator and a second cross-slope actuator, wherein the first cross-slope actuator is connected to said one of the plurality of track roller frames, and wherein the second cross-slope actuator is connected to another one of the plurality of track roller frames.

12. The track-type machine according to claim 10, wherein the work implement is a bucket.

13. The track-type machine according to claim 10, wherein the plurality of track roller frames are attached to the main frame via two pivot shafts and the equalizer bar.

14. The track-type machine according to claim 10, further comprising:

a controller configured to control the at least one cross-slope actuator to tilt the main frame in order to tilt the work implement.

15. The track-type machine of claim 14, wherein the controller is further configured to release the at least one cross-slope actuator based on receipt of a user input, and wherein, responsive to releasing the at least one cross-slope actuator, the track-type machine enters a mode of operation where the plurality of track roller frames are freely movable.

* * * * *